UNITED STATES PATENT OFFICE.

WILLIAM ELLISON ROWLANDS, OF SEACOMBE, ENGLAND.

PROCESS OF MAKING FERTILIZERS.

SPECIFICATION forming part of Letters Patent No. 602,363, dated April 12, 1898.

Application filed August 10, 1897. Serial No. 647,734. (No specimens.)

*To all whom it may concern:*

Be it known that I, WILLIAM ELLISON ROWLANDS, chemical-manure manufacturer, a citizen of England, residing at Seacombe, in the county of Chester, England, have invented a certain new and useful Manufacture of Manure from Waste Leather and Phosphate of Lime, of which the following is a specification.

My invention relates to the manufacture of manure from waste leather and phosphate of lime, which I effect as follows:

I subject the waste leather to fermentation by moistening it, adding, if necessary, some suitable ferment, such as barm, and piling it in mass until it becomes disintegrated by fermentation. Afterward a little of the fermented leather itself operates as a ferment for a fresh batch. I mix this fermented leather with crude phosphate of lime in various proportions, according to the purpose to which the manure is to be applied. I find a good proportion is five parts, by weight, of fermented leather to eight parts of phosphate of lime. I treat these substances in a suitable mixing-machine along with sulfuric acid in quantity sufficient to decompose the phosphate, and I thoroughly mix the whole, thus producing a valuable manure.

For special purposes other substances employed in the manufacture of manures—such, for instance, as salts of potash or sulfate of iron—may be mixed with the leather, phosphate, and acid or mixed with the product of these.

Having thus described the nature of this invention and the best means I know of carrying the same into practical effect, I claim—

The herein-described process of producing manure, consisting in fermenting waste leather, then mixing it with crude phosphate and finally agitating the mass with the addition of sulfuric acid in quantity sufficient to decompose the phosphate.

In testimony whereof I have signed my name to this specification, in the presence of two subscribing witnesses, this 30th day of July, A. D. 1897.

W. ELLISON ROWLANDS.

Witnesses:
  WALTER J. SKERTEN.
  G. LAYTON SMITH.